US007516312B2

(12) United States Patent
Wang et al.

(10) Patent No.: US 7,516,312 B2
(45) Date of Patent: Apr. 7, 2009

(54) PRESBYOPIC BRANCH TARGET PREFETCH METHOD AND APPARATUS

(75) Inventors: Hong Wang, Fremont, CA (US); Ralph Kling, Sunnyvale, CA (US); Edward T. Grochowski, San Jose, CA (US); Kalpana Ramakrishnan, Belmont, CA (US)

(73) Assignee: Intel Corporation, Santa Clara, CA (US)

( * ) Notice: Subject to any disclaimer, the term of this patent is extended or adjusted under 35 U.S.C. 154(b) by 304 days.

(21) Appl. No.: 10/817,263

(22) Filed: Apr. 2, 2004

(65) Prior Publication Data

US 2004/0193856 A1 Sep. 30, 2004

Related U.S. Application Data

(63) Continuation of application No. 09/518,939, filed on Mar. 6, 2000, now Pat. No. 6,732,260.

(51) Int. Cl.
G06F 15/00 (2006.01)
G06F 9/00 (2006.01)

(52) U.S. Cl. .................................. 712/237; 712/207

(58) Field of Classification Search .................. 712/207, 712/237, 238
See application file for complete search history.

(56) References Cited

U.S. PATENT DOCUMENTS 5,163,140 A 11/1992 Stiles et al. ................. 395/425
5,412,799 A 5/1995 Papadopoulos ............. 395/500
5,506,976 A 4/1996 Jagger ........................ 395/375
5,515,518 A 5/1996 Stiles et al. ................. 395/375
5,742,804 A 4/1998 Yeh et al. .................... 395/584
5,764,940 A 6/1998 Mallick et al. .............. 395/382
6,732,260 B1 * 5/2004 Wang et al. ................. 712/237

OTHER PUBLICATIONS www.dictionary.com © 2008 search term: presbyopic.*
"Microsoft Computer Dictionary", *4th Edition Microsoft Press*, (1999),p. 377.
"Microsoft Computer Dictionary Fourth Edition", *4th Edition 1Microsoft Press*, 1999,56 and 60.
Seznec, Andre, et al., "Multiple-Block Ahead Branch Predictors", *ASPLOS VII*, (Oct. 1996), 116-127.
Yeh, Tse-Yu, et al., "Increasing the Instruction Fetch Rate via Multiple Branch Prediction and a Branch Address Cache", *1993 ACM*, (1993),67-76.

* cited by examiner

*Primary Examiner*—Aimee J Li
(74) *Attorney, Agent, or Firm*—Schwegman, Lundberg & Woessner, P.A.

(57) ABSTRACT

An instruction prefetch apparatus includes a branch target buffer (BTB), a presbyopic target buffer (PTB) and a prefetch stream buffer (PSB). The BTB includes records that map branch addresses to branch target addresses, and the PTB includes records that map branch target addresses to subsequent branch target addresses. When a branch instruction is encountered, the BTB can predict the dynamically adjacent subsequent block entry location as the branch target address in the record that also includes the branch instruction address. The PTB can predict multiple subsequent blocks by mapping the branch target address to subsequent dynamic blocks. The PSB holds instructions prefetched from subsequent blocks predicted by the PTB.

10 Claims, 7 Drawing Sheets

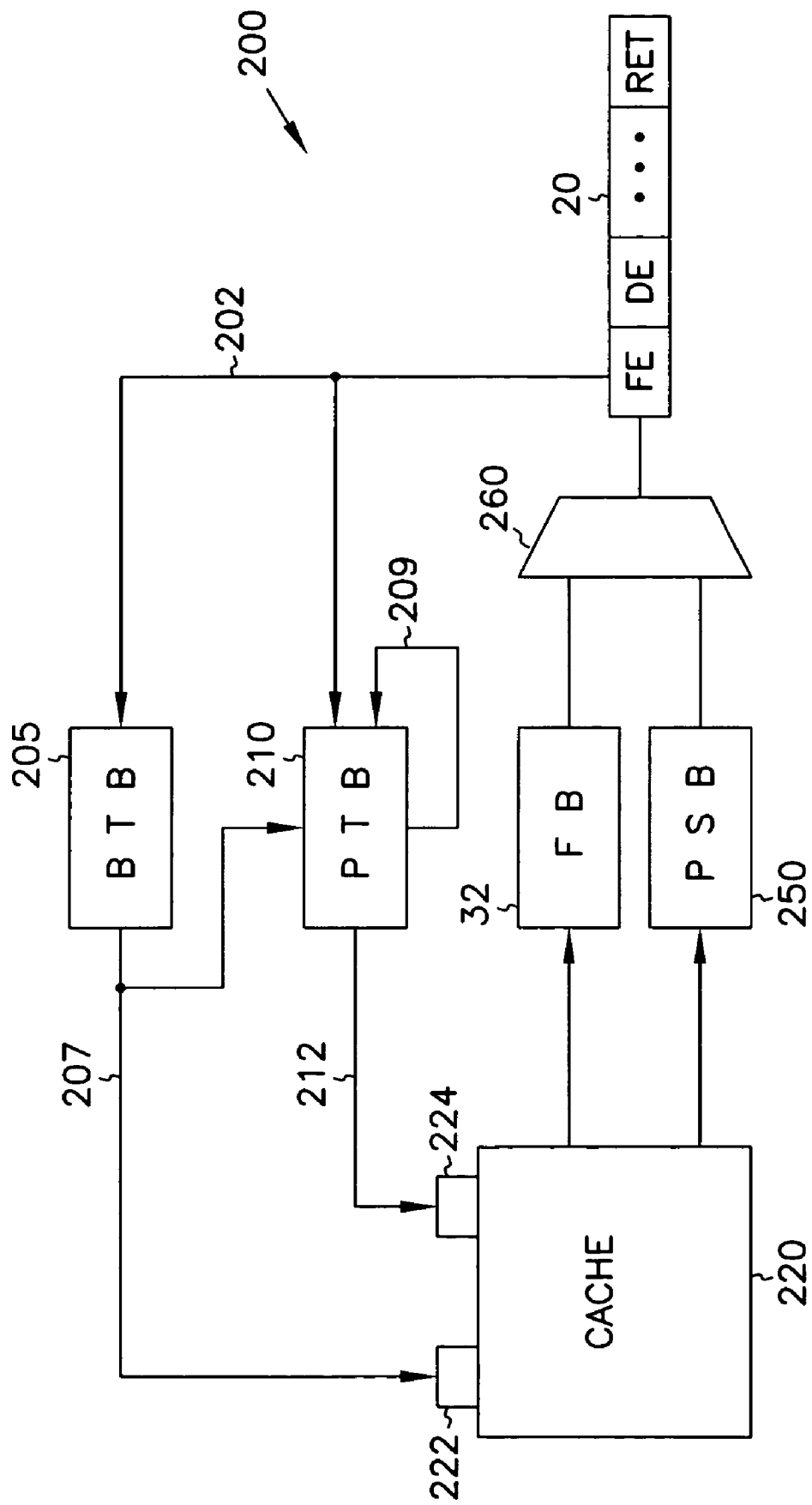

PRESBYOPIC BRANCH TARGET PREFETCH METHOD AND APPARATUS

This application is a continuation of U.S. patent application Ser. No. 09/518,939, filed on Mar. 6, 2000 now U.S. Pat. No. 6,732,260, which is incorporated herein by reference.

FIELD

The present invention relates generally to microprocessors, and more specifically to microprocessors employing branch target prediction and prefetch mechanisms.

BACKGROUND

Many modern microprocessors have large instruction pipelines that facilitate high speed operation. "Fetched" program instructions enter the pipeline, undergo operations such as decoding and executing in intermediate stages of the pipeline, and are "retired" at the end of the pipeline. When the pipeline receives a valid instruction each clock cycle, the pipeline remains full and performance is good. When valid instructions are not received each cycle, the pipeline does not remain full, and performance can suffer. For example, performance problems can result from branch instructions in program code. If a branch instruction is encountered in the program and the processing branches to the target address, a portion of the instruction pipeline may have to be flushed, resulting in a performance penalty.

Branch Target Buffers (BTB) have been devised to lessen the impact of branch instructions on pipeline efficiency. A discussion of BTBs can be found in: David A. Patterson & John L. Hennessy, Computer Architecture A Quantitative Approach 271-275 (2d ed. 1990). A typical BTB application is also shown in FIG. 1A. FIG. 1A shows BTB 10 coupled to instruction pointer (IP) 18, and processor pipeline 20. Also included in FIG. 1A are cache 30 and fetch buffer 32.

The location of the next instruction to be fetched is specified by IP 18. As execution proceeds in sequential order in a program, IP 18 increments each cycle. The output of IP 18 drives port 34 of cache 30 and specifies the address from which the next instruction is to be fetched. Cache 30 provides the instruction to fetch buffer 32, which in turn provides the instruction to processor pipeline 20. Fetch buffer 32 typically has a latency associated therewith, herein referred to as "Icache latency."

When instructions are received by pipeline 20, they proceed through several stages shown as fetch stage 22, decode stage 24, intermediate stages 26, and retire stage 28. Information on whether a branch instruction results in a taken branch is typically not available until a later pipeline stage, such as retire stage 28. When BTB 10 is not present and a branch is taken, fetch buffer 32 and the portion of instruction pipeline 20 following the branch instruction hold instructions from the wrong execution path. The invalid instructions in processor pipeline 20 and fetch buffer 32 are flushed, and IP 18 is written with the branch target address. A performance penalty results, in part because the processor waits while fetch buffer 32 and instruction pipeline 20 are filled with instructions starting at the branch target address. The performance penalty is roughly equal to the sum of the Icache latency and the processor pipeline latency.

Branch target buffers lessen the performance impact of taken branches. BTB 10 includes records 11, each having a branch address (BA) field 12 and a target address (TA) field 14. TA field 14 holds the branch target address for the branch instruction located at the address specified by the corresponding BA field 12. When a branch instruction is encountered by processor pipeline 20, the BA fields 12 of records 11 are searched for a record matching the address of the branch instruction. If found, IP 18 is changed to the value of the TA field 14 corresponding to the found BA field 12. As a result, instructions are next fetched starting at the branch target address. This mechanism is commonly referred to as "branch target prefetch."

Branch target prefetch can occur while the branch instruction is still early in the processor pipeline, such as in decode stage 24. In this case, when the predicted branch is actually taken, the latency is reduced from the sum of the Icache latency and the processor pipeline latency described above; however, the penalty associated with fetch buffer 32 (Icache latency) remains.

The latency associated with the use of BTB 10 is shown in FIG. 1B. In region 60, the processor pipeline has filled, and performance is good. In region 70, a branch is taken, and the fetch buffer is flushed and refilled. As shown in region 70, performance drops as the pipeline is flushed, and then performance is regained as the pipeline is refilled. Performance drops during latency period 50. Latency period 50 is a function of the fetch buffer depth and the relative speeds of the processor pipeline and the cache. As the processor pipeline increases in speed, latency period 50 increases when expressed as a number of cycles.

For the reasons stated above, and for other reasons stated below which will become apparent to those skilled in the art upon reading and understanding the present specification, there is a need in the art for an alternate method and apparatus for branch target prefetch.

BRIEF DESCRIPTION OF THE DRAWINGS

FIG. 2 shows a processor including a presbyopic branch target prefetch mechanism;

DESCRIPTION OF EMBODIMENTS

Figure 1A:
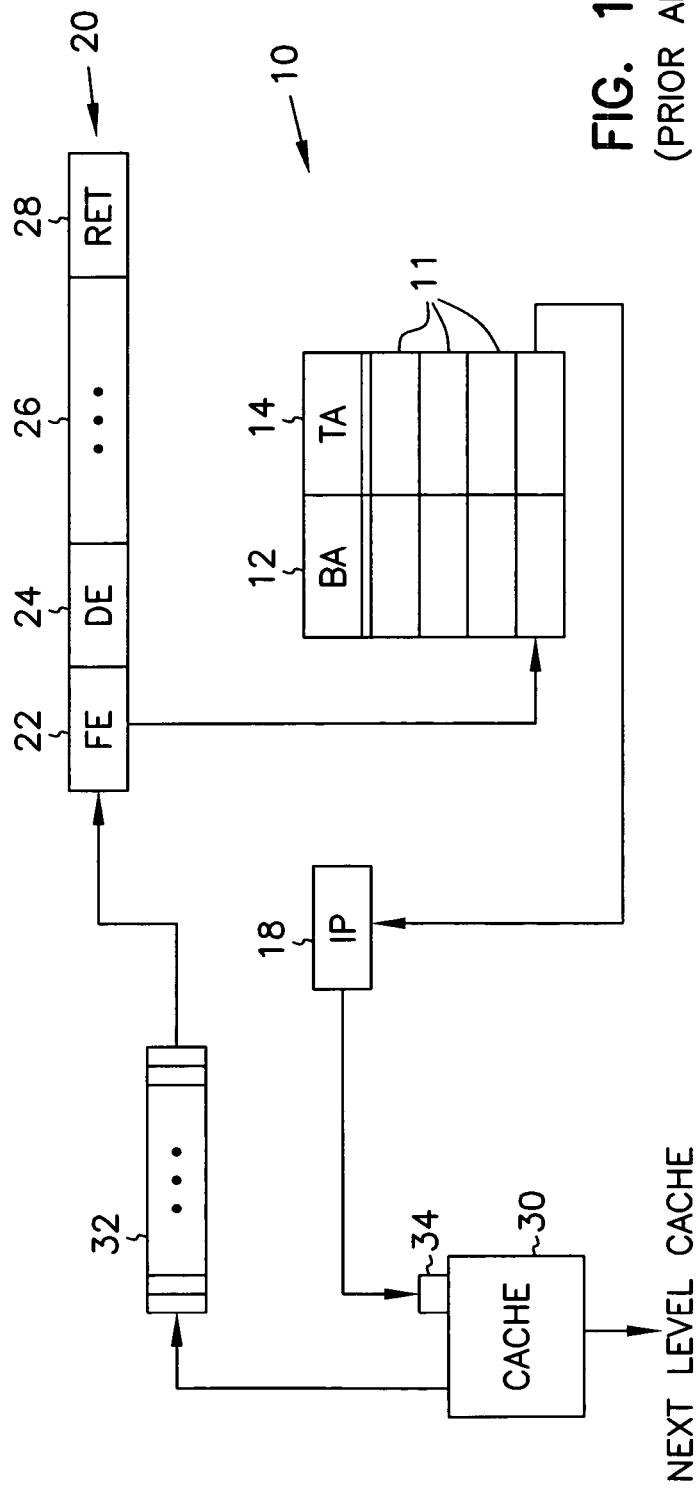
FIG. 1A is a prior art branch target prefetch mechanism.
Figure 1B:
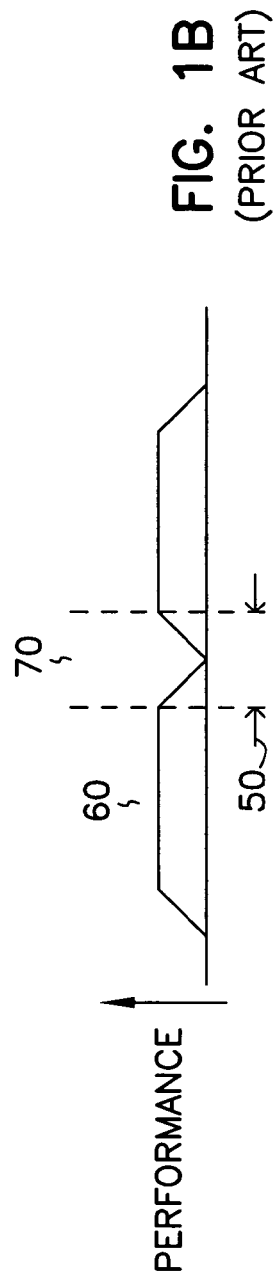
FIG. 1B shows prior art performance during a branch target prefetch.

In the following detailed description of the embodiments, reference is made to the accompanying drawings that show, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. Moreover, it is to be understood that the various embodiments of the invention, although different, are not necessarily mutually exclusive. For example, a particular feature, structure, or characteristic described in one embodiment may be included within other embodiments. The following detailed description is, therefore, not to be taken in a limiting sense, and the scope of the present invention is defined only by the appended claims, along with the full scope of equivalents to which such claims are entitled.

FIG. 2 shows a processor including a presbyopic branch target prefetch mechanism. Apparatus 200 includes branch target buffer (BTB) 205, presbyopic target buffer (PTB) 210, and cache memory 220. Apparatus 200 also includes fetch buffer (FB) 32, target block prefetch stream buffer (PSB) 250, multiplexer 260, and processor pipeline 20. BTB 205 receives branch instruction addresses from processor pipeline 20 on node 202 and predicts branch target addresses. Branch target addresses are provided to port 222 of cache 220, and processor instructions starting at the target address are provided to FB 32.

BTB 205 also provides the branch target address to PTB 210 on node 207. In some embodiments, PTB 210, unlike BTB 205, maps branch target addresses to subsequent branch target addresses. For example, whereas BTB 205 maps an exit IP from a block to an entrance IP of a subsequent block, PTB 210 maps an entrance IP of a block to an entrance IP of a subsequent block. Embodiments of PTB 210 are described more fully with reference to FIGS. 4A and 4B below.

In some embodiments, PTB 210 can be recursively searched as shown by node 209 in FIG. 2. Recursive searching in PTB 210 is also more fully explained below. PTB 210 provides the entrance IP of a subsequent block to cache 220 on port 224. Instructions fetched from the subsequent block entrance IP are provided to PSB 250. PSB 250 is a prefetch stream buffer capable of holding instructions prefetched as a result of the operation of PTB 210. In some embodiments, PSB 250 is at least as long as the Icache latency so that when FB 32 is flushed as a result of a branch, prefetched instructions can be provided from PSB 250 through multiplexor 260.

PTB 210 operates as a "far-sighted" branch target buffer through the various mapping schemes and recursive searches employed. Branch targets and subsequent blocks that dynamically reside multiple blocks in the future can be predicted by PTB 210, as is explained in more detail below. PTB 210 is referred to as "presbyopic" to reflect the far-sighted nature of its operation, and to differentiate PTB 210 from BTB 205.

Figure 3:
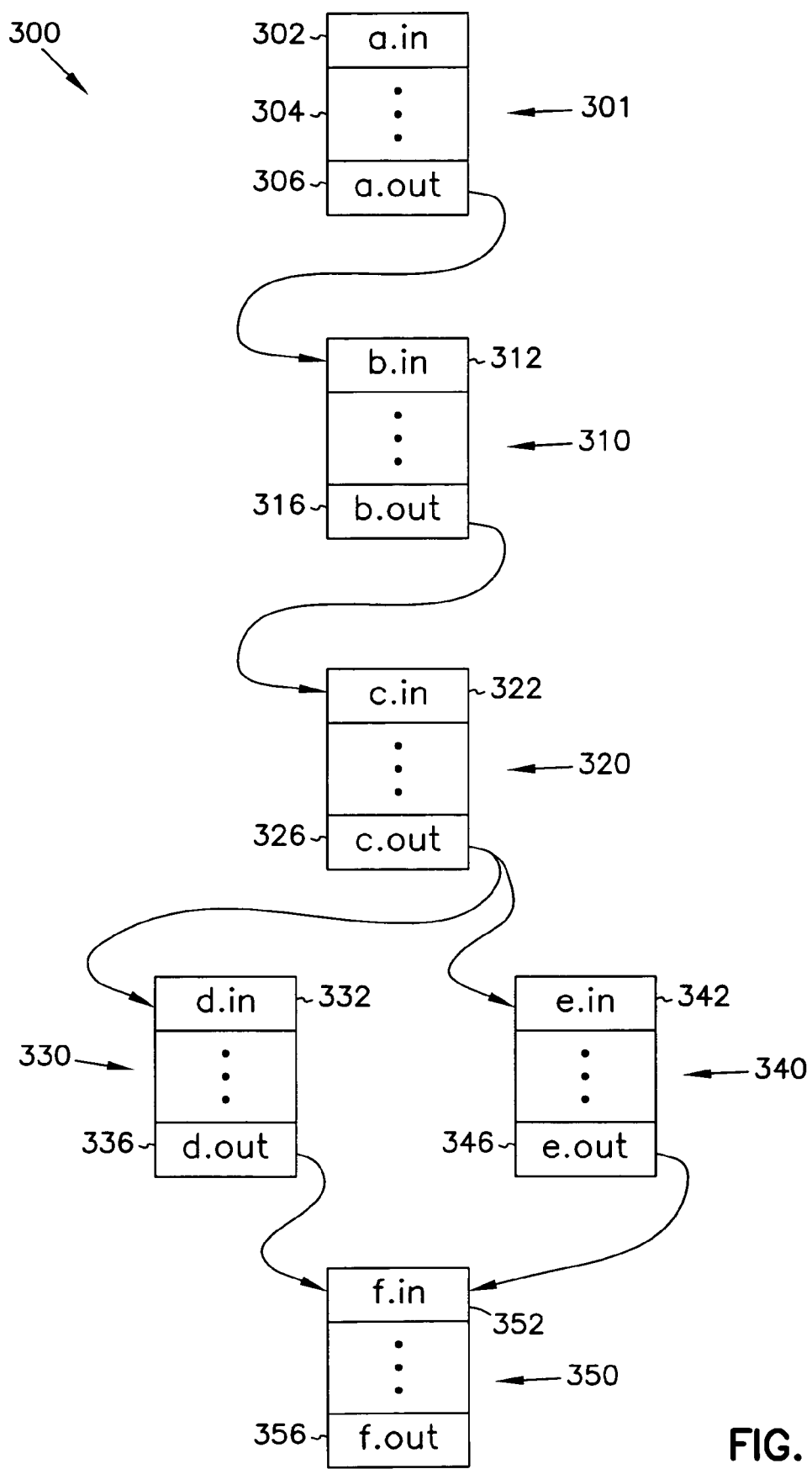
FIG. 3 shows a software control flow graph.

FIG. 3 shows a software control flow graph. Control flow graph 300 shows blocks 301, 310, 320, 330, 340, and 350, which represent software code regions, or "blocks," each including a block entrance instruction, intermediate instructions, and a block exit instruction. Each of these instructions occurs at a location specified at runtime as an IP value. For example, block 301 has an instruction labeled "a.in" at entrance IP 302, has an instruction labeled "a.out" at exit IP 306, and has intermediate instructions 304 therebetween. The entrance IP of each block can be a target address for a branch instruction. For example, in block 301, when "a.out" is a branch instruction, "b.in" is the target address of the branch instruction. In general, target addresses of branch instructions correspond to entrance IPs of subsequent blocks.

Blocks that occur later in the control flow are termed "subsequent blocks." For example, blocks 310 and 320 are blocks subsequent to block 301. Likewise, blocks 330, 340, and 350 are blocks subsequent to blocks 301, 310, and 320. "Dynamically adjacent" subsequent blocks are blocks that execute one after another. For example, blocks 320 and 330 are dynamically adjacent, but blocks 310 and 330 are not. Dynamically adjacent blocks are not necessarily physically adjacent in the program code.

Blocks 320, 330, 340, and 350 form a "hammock." A hammock occurs when the control flow can branch to different subsequent blocks, and the different subsequent blocks return control to a common subsequent block. For example, in control flow graph 300, block 320 can branch to either block 330 or block 340. In other words, the "c.out" instruction at exit IP 326 can have a target address that resolves to either entrance IP 332 or entrance IP 342. When the target address resolves to entrance IP 332, control flow branches to block 330, and instructions beginning with "d.in" are executed. In contrast, when the target address resolves to entrance IP 342, control flow branches to block 340, and instructions beginning with "e.in" are executed.

The hammock is formed because both blocks 330 and 340 branch to block 350. For example, in block 330, the "d.out" instruction at exit IP 336 branches to the "f.in" instruction at entrance IP 352. Likewise, in block 340, the "e.out" instruction at exit IP 346 also branches to the "f.in" instruction at entrance IP 352. Even if branch prediction from block 320 to either block 330 or 340 is unreliable, predicting block 350 as a block subsequent to block 320 may be reliable as a result of the hammock.

Figure 4A:
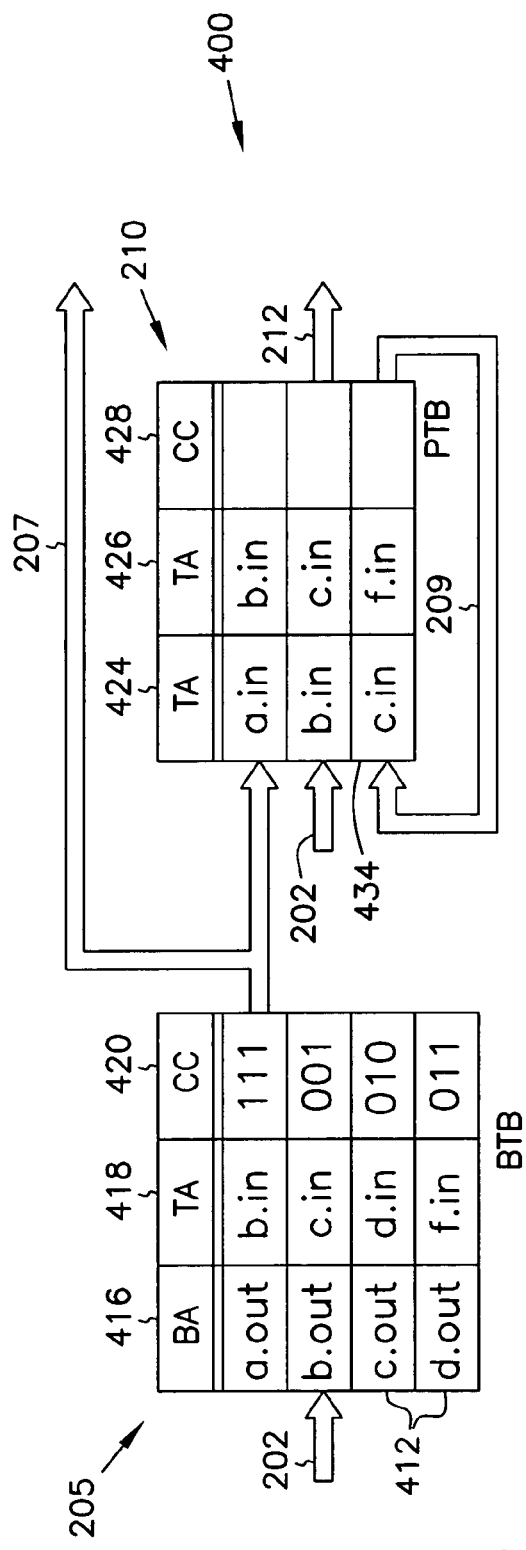
FIG. 4A shows a branch target buffer and a presbyopic target buffer in accordance with an embodiment of the invention.

As just described, hammocks can create a scenario where prediction may be more reliable when predicted subsequent blocks are not dynamically adjacent, but are instead more than one dynamic block away. "Skip-adjacent" prediction can be used to reliably predict subsequent blocks more than one dynamic block away. FIG. 4A gives one example of skip-adjacent prediction.

FIG. 4A shows a branch target buffer and a presbyopic target buffer in accordance with an embodiment of the invention. Embodiment 400 includes branch target buffer (BTB) 205, and presbyopic target buffer (PTB) 210. BTB 205 is an array that caches records 412. Each record 412 is organized into fields which include branch address (BA) field 416, target address (TA) field 418, and confidence counter field (CC) 420. BA field 416 holds the address of branch instructions, and TA field 418 holds addresses of branch targets. For example, the first record shown in BTB 205 maps "a.out" to "b.in." As shown in FIG. 3, "a.out" is a branch instruction at a block exit, and "b.in" is the first instruction at a subsequent block entrance.

BTB 205 receives the current instruction pointer on node 202 and performs a search of BA field 416. If a matching record is found, the current instruction pointer on node 202 points to a branch instruction and BTB 205 predicts the target address by sending the corresponding TA field 418 value out on node 207. For example, when node 202 has the address of "b.out" impressed thereon, BTB 205 will drive node 207 with the address of "c.in."

BTB 205 also includes CC Field 420. In some embodiments, CC Field 420 includes a saturating counter that counts the number of times the cached branch is taken. For example, in embodiment 400, CC Field 420 includes a 3 bit saturating counter. Each time the cached branch is taken, the saturating counter in CC Field 420 is incremented. When the counter reaches the maximum value, the counter remains at the maximum value and no longer increments. Each time the branch is not taken, the saturating counter decrements. If a saturating counter drops below zero, then the confidence in the cached branched is eroded to the point that the corresponding record is removed from BTB 205. In some embodiments, CC field 420 is kept small, in part because BTB 205 can be on a critical path for instruction fetches. In embodiment 400, CC field 420 is shown as three bits wide. In this embodiment, eight consecutive non-taken branches will cause a record be removed from BTB 205.

PTB 210 includes records that map a branch target address (or an entrance to a block) to a subsequent branch target address (or to an entrance to a subsequent dynamic block). PTB 210 includes target address (TA) fields 424 and 426. PTB 210 receives the current instruction pointer value on node 418 and performs a search for a record having a matching value in TA field 424. When found, the contents of TA field 426 are driven on node 212. Node 212 can then be used to drive a cache port, such as cache port 224 (FIG. 2).

PTB searches and predictions can occur in the same clock cycle as the BTB search, or can be deferred to subsequent clock cycles. In addition, PTB lookup and prediction can be performed either upon the BTB lookup at the fetch stage in the front end of pipeline 20 (FIG. 2), or after the branch target address is actually resolved at the end of the pipeline.

PTB 210 can also perform recursive searches. A recursive search is performed when PTB 210 drives node 209 with a target address from TA field 426, and searches TA field 424. In this manner, PTB 210 can predict multiple subsequent dynamic blocks. For example, when block entrance IP 302 (FIG. 3) appears as an input to PTB 210 on node 418, PTB 210 matches the first record and drives node 209 with entrance IP 312, which is the address of the instruction "b.in." PTB 210 receives this, performs a search, and finds a record that maps "b.in" to "c.in," and drives the address of "c.in" on node 209. PTB 210 can then recursively search based on the address on node 209.

Searches can also include BTB 205 and PTB 210 in combination. When a branch instruction is pointed to by the current IP on node 202, BTB 205 will drive the corresponding target address (if a matching record is found) on node 207. PTB 210 receives the target address on node 207 and can use it to perform a search for a subsequent dynamic block. For example, if the location of "b.out" is on node 202, BTB 205 will drive node 207 with the location of "c.in." PTB 210 receives the location of "c.in" on node 207, finds a matching record, and drives nodes 212 and 209 with the location of "f.in." At this point, a further recursive search can take place.

Recursive searches of PTB 210, and searches utilizing both BTB 205 and PTB 210 result in "domino prediction." Domino prediction occurs when multiple subsequent dynamic blocks are predicted. PTB 210 can perform domino prediction off the critical path, and can cause the prefetch of instructions from subsequent blocks more than one dynamic block away. Referring now to FIG. 2, PTB 210 is shown driving port 224 of cache 220. Cache 220 sends prefetched instructions to PSB 250. When performing domino prediction, PSB 250 can include instructions prefetched from multiple predicted subsequent dynamic blocks. PSB 250 can include all of the instructions from a predicted block, or can include a subset of the predicted block.

Some embodiments support multi-way domino prediction. For branches that are likely to frequently take multiple dynamic targets, multiple target basic blocks can be captured via associating a single BTB record with multiple PTB records. In some embodiments, BTB 205 and PTB 210 include index fields for the association, and in other embodiments, multiple PTBs are implemented.

PTB 210 also includes confidence counter (CC) field 428. CC field 428 operates in a manner similar to that of CC field 420 of BTB 205. Each time a predicted branch is actually taken, the corresponding CC field 428 is incremented unless saturated, and each time the predicted branch is not taken, CC field 428 is decremented. In some embodiments, the confidence counter of PTB 210 is larger than confidence counters used in BTB 215. Because PTB 210 performs subsequent block prediction well in advance of the actual execution of the predicted subsequent block, PTB 210 is not on the critical path. More time can be taken to increment and decrement confidence counters, and so CC field 428 can be large. A large CC field 428 in PTB 210 can increase the accuracy of subsequent dynamic block prediction.

PTB 210 can also perform skip-adjacent prediction. Record 434 within PTB 210 is an example of a PTB record that performs skip-adjacent prediction. Record 434 maps the location of instruction "c.in" to the location of instruction "f.in." This corresponds to mapping entrance IP 322 of block 320 to entrance IP 352 of block 350 (FIG. 3). When this prediction occurs, PSB 250 can include instructions from block 320 ("a" instructions) and instructions from block 350 ("f" instructions) without including any instructions from either block 330 or 340 ("d" or "e" instructions). This is an example of skip-adjacent prediction because blocks dynamically adjacent to block 320 are skipped in favor of a subsequent block occurring later in the control flow.

When BTB 205 is searched, and a matching record is found, the current IP specifies the location of a branch instruction. If BTB 205 and PTB 210 are populated with records that correctly predict the branches taken on the current control flow, the instruction located at the predicted target address and its subsequent instructions are likely already in PSB 250 (FIG. 2), because this current branch has likely been predicted previously as a domino prediction.

In some embodiments, BTB 205 and PTB 210 share a single target address array. For example, BTB 205 includes a record that maps "b.out" to "c.in," and PTB 210 includes a record that maps "b.in" to "c.in." The "c.in" target field value is common to both BTB 205 and PTB, and can be shared.

In some embodiments, domino prediction is performed in a "disjoint eager" fashion, in which a confidence gauge is associated with each branch prediction made speculatively along a dynamic path. As predictions are made further along the path, the confidence of the prediction degrades. As prediction confidence degrades, multiple alternative targets can be fetched instead of choosing a single path. When disjoint eager domino prediction is performed, instructions can be prefetched into PSB 250 (FIG. 2) from multiple disjoint paths.

TA fields 424 and 426 can includes the total number of bits needed to unambiguously specify an address, or can include a lesser number. For example, in a processor that specifies addresses using 32 bits, TA fields 424 and 426 may be 32 bits wide or less than 32 bits wide. Using 32 bits will unambiguously specify the address, but will also take up storage space. In some embodiments, TA fields 424 and 426 include fewer than the total number of bits, and introduce a small amount of ambiguity in exchange for reduced size.

When fewer than the total number of bits is used, a matching record may correspond to a branch instruction that is aliased to the current IP value. For example, an instruction that is not at a block entry or a block exit may cause a match in PTB 210 if the subset of bits used to specify TA field 424 matches. In some embodiments, an additional pipeline stage in pipeline 20 (FIG. 2) is used to check for a full address match to check for this condition.

BTB 205 and PTB 210 are populated with records as branches are encountered during the execution of the software. When a new branch is taken, a new record is entered in BTB 205, and the branch address and target address are filled in. For each branch IP installed in BTB 205, the target address is also installed in a new record in PTB 210. In some embodiments, a parentheses matching state machine is employed to capture the entrance IP of a block before the exit IP of the same block is installed in BTB 205. When the BTB record is installed, the corresponding PTB record can also be installed. For example, a parentheses matching state machine can record the location of "a.in" when it is encountered, and leave the parentheses "open." When "a.out" is encountered, and control branches to "b.in," the state machine "closes" the parentheses, and the PTB record that maps "a.in" to "b.in" can be installed at the same time as the BTB record that maps "a.out" to "b.in." If an exception occurs when the parentheses matching state machine is "open," the PTB record may never be installed. In this case, a BTB record will exist without a corresponding PTB record.

Figure 4B:
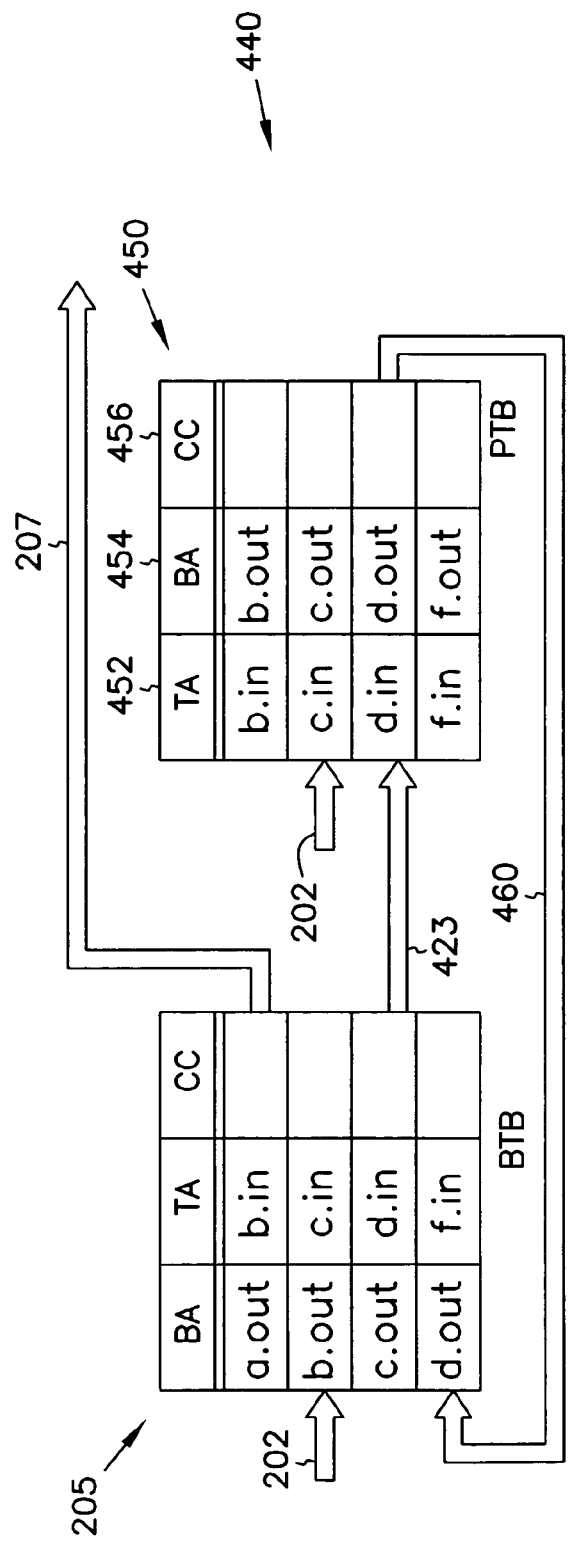
FIG. 4B shows a branch target buffer and a presbyopic target buffer in accordance with another embodiment of the invention.

FIG. 4B shows a branch target buffer and a presbyopic target buffer in accordance with another embodiment of the invention. Embodiment 440 includes BTB 205 and PTB 450. BTB 205 accepts the current IP value on node 202, and also accepts a branch address from PTB 450 on node 460. In embodiment 440, PTB 450 has records that map target addresses (TA) 452 to branch addresses (BA) 454. TA 452 and BA 454 correspond to entrance IPs and exit IPs of blocks.

As shown in FIG. 4B, PTB 450 maps block entrance IPs to block exit IPs. For example, the first record in PTB 450 maps the location of instruction "b.in" to the location of instruction "b.out." In embodiment 440, the combination of BTB 205 and PTB 450 can be recursively searched. For example, when node 202 has the location of instruction "b.out" impressed thereon, BTB 205 finds a matching record, and drives node 423 with the location of instruction "c.in." PTB 450 performs a search of TA fields 452, finds a matching record, and drives node 460 with the location of instruction "c.out." This process can continue to predict multiple subsequent dynamic blocks.

Figure 5:
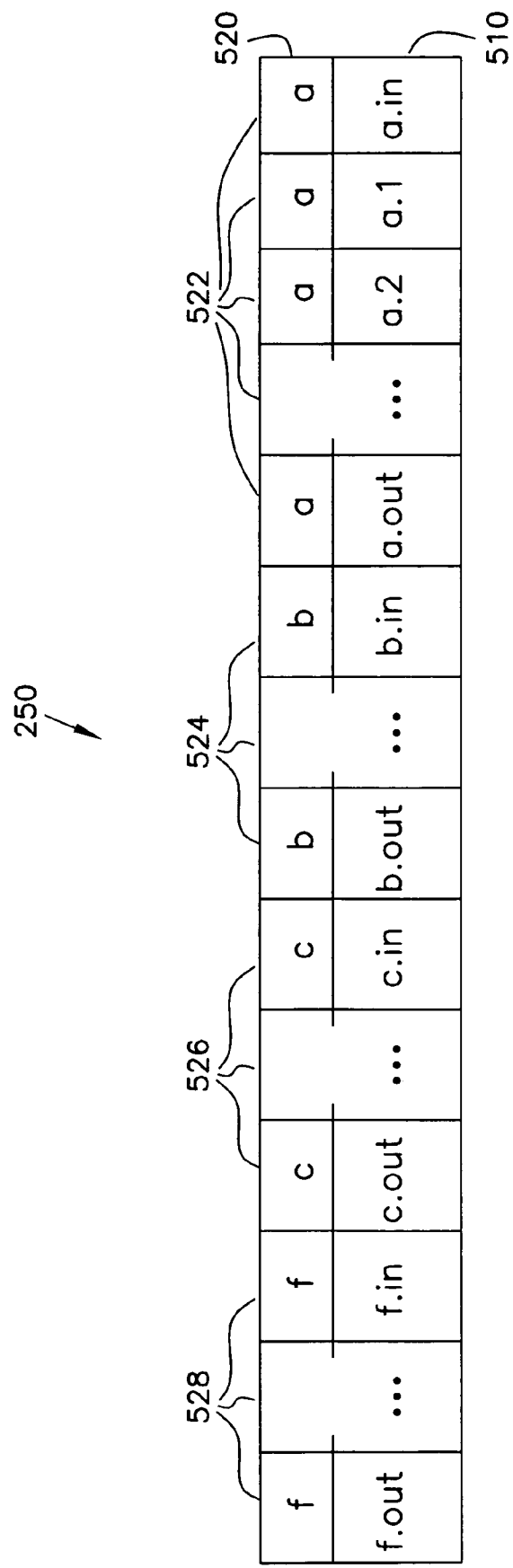
FIG. 5 shows a prefetch stream buffer.

FIG. 5 shows a prefetch stream buffer. Prefetch stream buffer (PSB) 250 includes instructions fetched as a result of subsequent blocks predicted by the action of a presbyopic target buffer, such as PTB 210 (FIG. 2). Each record in PSB 250 includes an instruction 510 and a coloring field 520. Instruction field 510 holds prefetched instructions, and coloring field 520 serves to demarcate boundaries between blocks of instructions included within PSB 250. For example, entries 522 correspond to block "a," shown in FIG. 3 as block 301. Entries 522 are shown having a value of "a" in field 520, thereby signifying entries 522 having instructions from block 301. Likewise, entries 524 have coloring field 520 values of "b," entries 526 have coloring field 520 values of "c," and entries 528 have coloring field 520 values of "f." Each of these values corresponds to a different block in control flow graph 300 (FIG. 3).

In some embodiments, coloring fields 520 are assigned a sequentially allocated unique number for each block that is predicted and prefetched into PSB 250. The value of the block color can be produced with a shift register, with the least significant bit representing the prediction of the latest branch. In this manner, the color value assigned to coloring field 520 is similar to a fragment of global history. In some embodiments, a cache or other memory structure is employed to save past color history, and the characteristic signature branch IP is used to retrieve past color history to hint or guide future domino predictions. This can be used to bound the depth of domino prediction.

In some embodiments, coloring field 520 is represented by a finite number of bits, such that each possible field value represents a different block. If a branch is mispredicted, coloring field 520 can be used to flush or invalidate instructions on the mispredicted path. For example, if PSB 250 included instructions for block "e," and block "d" was traversed instead, the instructions for block "e" could be identified within PSB 250 and flushed.

When disjoint eager prediction is performed, coloring field 520 can be assigned values such that mutually exclusive disjoint eagerly predicted and prefetched blocks are identified as such. As branch targets are resolved, blocks dependent on predicates compatible with the conditional code of the mispredicted branch can be flushed from PSB 250.

In some embodiments, PSB 250 is at least as long as FB 32 (FIG. 2), referred to as the Icache latency. When branch prediction by PTB 210 is correct, and PSB 250 has at least enough prefetched instructions to overcome the Icache latency, performance improves over a system with a branch target buffer alone. In embodiments capable of domino prediction, PSB 250 can be large enough to hold instructions from multiple subsequent dynamic blocks. In some embodiments, all of the instructions from the predicted blocks are prefetched, and in other embodiments, just enough instructions are prefetched from each predicted subsequent dynamic block to overcome the Icache latency.

Figure 6:
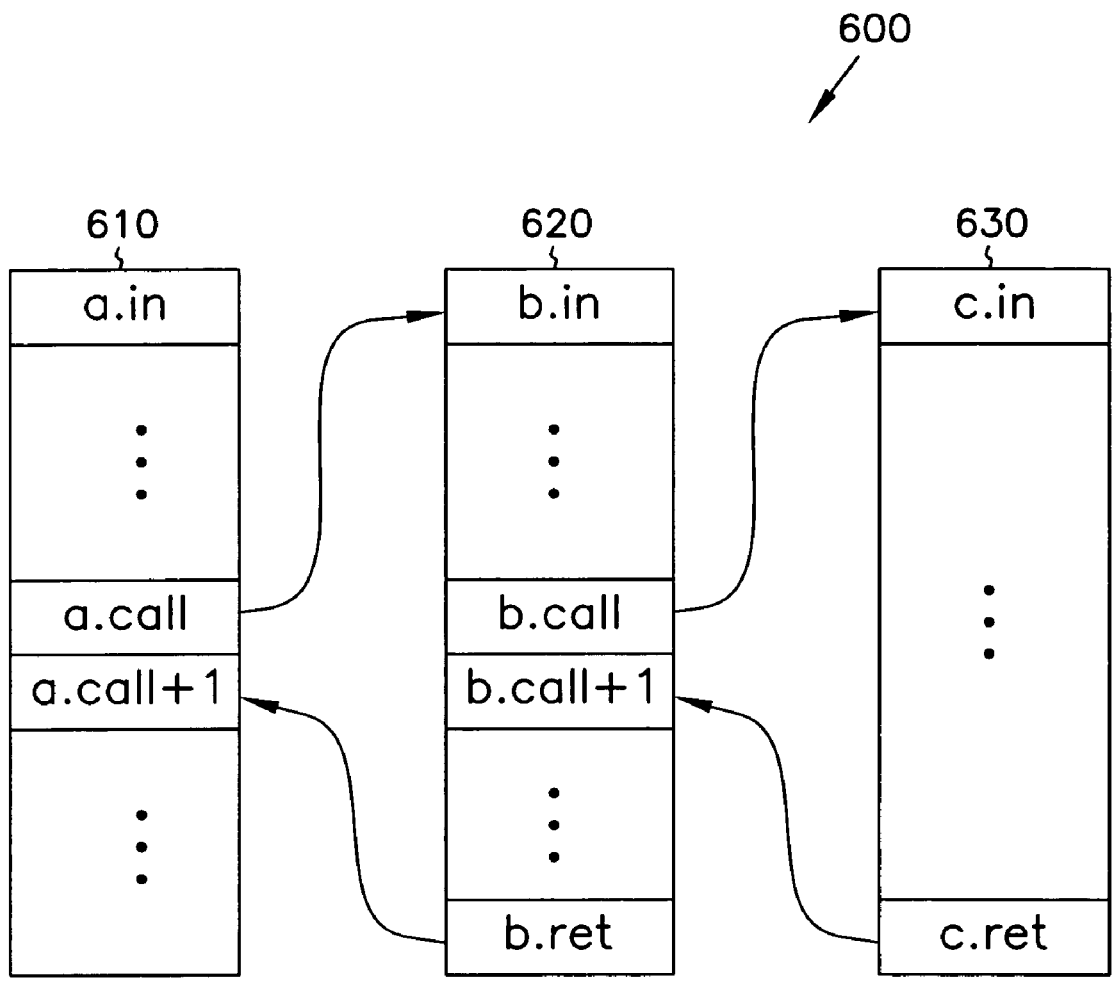
FIG. 6 shows a series of function calls and returns.

FIG. 6 shows a series of functions calls and returns. Embodiment 600 includes software functions 610, 620, and 630. Instructions within software function 610 are prefixed with the letter "a," instructions within software function 620 are prefixed with the letter "b," and instructions within software function 630 are prefixed with the letter "c." In the control flow shown in FIG. 6, function 610 starts at the instruction "a.in," and continues until reaching instruction "a.call," which calls software function 620. The next instruction executed is "b.in," and execution continues in software function 620 until reaching instruction "b.call," which calls software function 630. Software function 630 executes from instruction "c.in" to instruction "c.ret." Instruction "c.ret" is a "return" instruction that causes execution to branch back to the calling point. As a result of the return instruction, execution branches from instruction "c.ret" to instruction "b.call+1," which is one instruction location away from instruction "b.call." Software function 620 returns in the same manner when execution branches from instruction "b.ret" to instruction "a.call+1."

In some embodiments, function returns, such as those caused by instructions "c.ret" and "b.ret," can be predicted in a manner similar to branch prediction described with reference to the preceding figures. For example, return instructions can be treated as block exits, and instructions occurring after call instructions can be treated as block entrances. One such embodiment is now explained with reference to FIG. 7.

Figure 7:
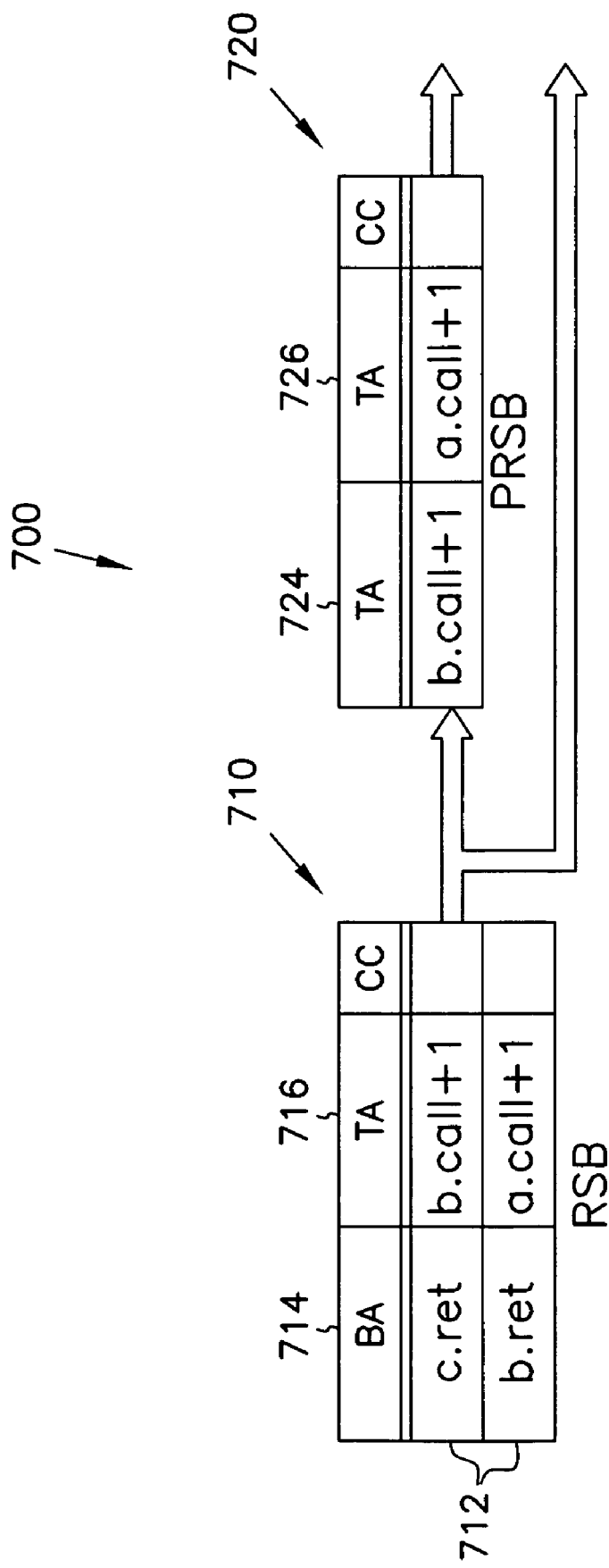
FIG. 7 shows a return stack buffer and a presbyopic return stack buffer.

FIG. 7 shows a return stack buffer and a presbyopic return stack buffer. Embodiment 700 shows return stack buffer (RSB) 710 and presbyopic return stack buffer (PRSB) 720. RSB 710 operates in a manner similar to BTB 205 (FIG. 4A). Each of records 712 includes a branch address (BA) field 714 and a target address (TA) field 716. Within RSB 710, BA field 714 holds the address of return instructions, and TA field 716 holds the address of instructions dynamically following the return instructions. For example, the first record of RSB 710 caches the address of instruction "b.call+1" as the address predicted to follow the address of instruction "c.ret."

PRSB 720 includes records that map target addresses to target addresses. For example, the record shown in PRSB 720 predicts instruction "a.call+1" to follow instruction "b.call+1." RSB 710 and PRSB 720 can be utilized together in a manner similar to embodiments 400 (FIG. 4A) and 440 (FIG. 4B) to predict blocks subsequent to a function return.

RSB 710 and PRSB 720 have been described with reference to function calls and returns, but are also applicable to jump target tables. The combination of RSB 710 and PRSB 720 can be used to map the entrance IP of a block to the jump target of the block, such that instructions at the next target block can be prefetched upon entrance into the current block that is ended by a jump.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A processor comprising:
   a processor pipeline to output branch instruction addresses;
   a branch target buffer responsive to the branch instruction addresses, wherein the branch target buffer comprises branch target buffer records to map branch instruction addresses to branch target addresses associated with an entry location of a first code region, wherein the branch target buffer records comprise confidence counters to track a number of times branches associated with the branch target addresses are taken; and
   a presbyopic target buffer responsive to the branch target buffer, wherein the presbyopic target buffer comprises presbyopic target buffer records to map the entry location of the first code region to an entry location of a second code region;
   a cache memory to retrieve the instructions at the branch target addresses and the instructions at the subsequent branch target addresses;
   a fetch buffer to receive the instructions at the branch target addresses;
   a prefetch stream buffer to receive the instructions at the subsequent branch target addresses.

2. The processor of claim 1 wherein the presbyopic target buffer is configured to be recursively searched to predict a plurality of subsequent branch target addresses.

3. The processor of claim 1 wherein the presbyopic target buffer implements skip-adjacent mapping.

4. The processor of claim 1 wherein a complete branch target address is specified by a fixed number of bits, and the presbyopic target buffer includes mapping records that specify branch target addresses using less than the fixed number of bits.

5. The processor of claim 1, wherein the presbyopic target buffer records comprise confidence counters to track a number of times branches associated with the subsequent branch target addresses are taken.

6. A method comprising:
   processing instructions in a processor pipeline, wherein the processing is to output branch instruction addresses
   in a branch target buffer that maps the branch instruction addresses to block entry addresses associated with entry locations of first code regions, searching for a branch target buffer record having a branch instruction address that matches a current instruction address;
   after the branch target buffer record is found, incrementing a confidence counter in the branch target buffer record and searching a presbyopic target buffer that maps entry locations of the first code region to entry locations of a second code region for a presbyopic target buffer record having a block entry address matching the branch target buffer record; and
   after the presbyopic target buffer record is found, incrementing a confidence counter in the presbyopic target buffer record and prefetching instructions beginning at the entry location of the second code region included in the presbyopic target buffer record.

7. The method of claim 6 wherein prefetching comprises entering instructions into a stream buffer, the stream buffer having a coloring field for each instruction entered.

8. The method of claim 6 further comprising:
   searching the presbyopic target buffer recursively; and
   for each matching record found in the presbyopic target buffer, each matching record having a corresponding subsequent block entry address, prefetching instructions from each of the corresponding subsequent block entry addresses.

9. The method of claim 8 wherein prefetching comprises:
   entering instructions into a stream buffer, the stream buffer having a coloring field for each instruction entered; and
   assigning a different color to instructions fetched from different subsequent block entry addresses.

10. The method of claim 9 wherein each recursive search represents a predicted branch, the method further comprising flushing from the stream buffer instructions prefetched as a result of a mispredicted branch.

* * * * *